F. KNACK.
AIR COUPLING VALVE.
APPLICATION FILED MAR. 31, 1911.
1,022,851.
Patented Apr. 9, 1912.
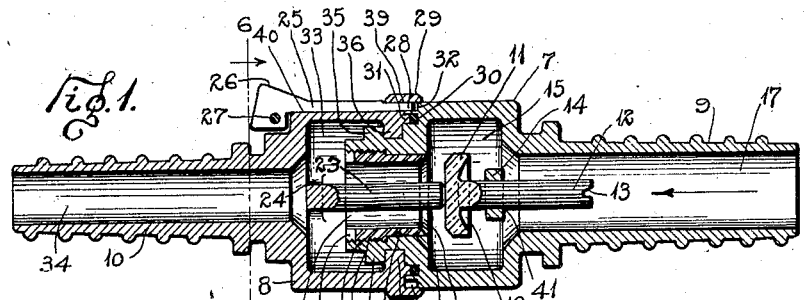
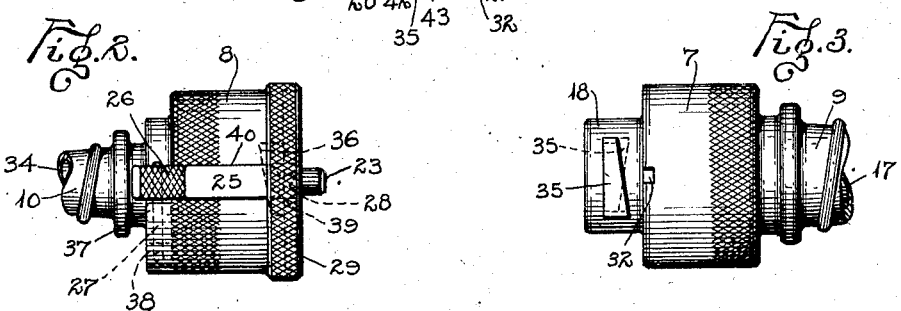
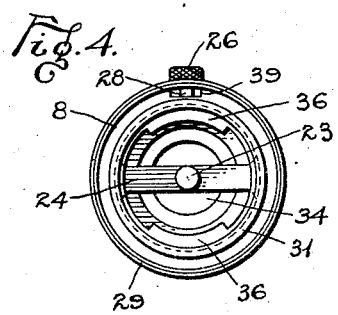
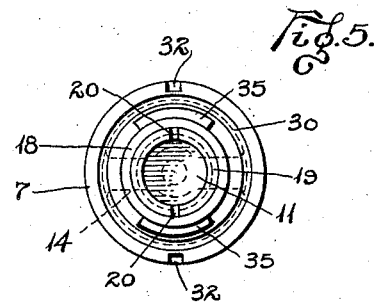
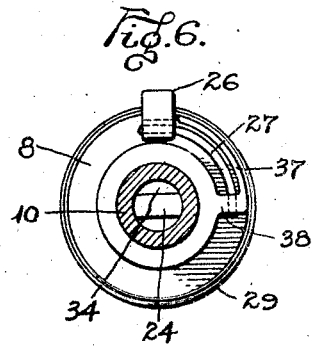
Witnesses:
Catherine P. Ostendorf
Emory L. Groff
Fred Knack, Inventor,
By Thomas R. Harney and
Monroe E. Miller,
Attys.

UNITED STATES PATENT OFFICE.

FRED KNACK, OF CLEVELAND, OHIO.

AIR COUPLING-VALVE.

1,022,851.  Specification of Letters Patent.  Patented Apr. 9, 1912.

Application filed March 31, 1911. Serial No. 618,238.

*To all whom it may concern:*

Be it known that I, FRED KNACK, a citizen of the United States, residing at Cleveland, in the county of Cuyahoga and State of Ohio, have invented certain new and useful Improvements in Air Coupling-Valves, of which the following is a specification.

This invention relates to valves, and more particularly to air coupling valves, the object of the invention being to provide an improved valve of this character which will be inexpensive to manufacture and efficient in its use.

The invention as hereinafter described comprises of novelty in construction, as will be more fully understood by reference to the accompanying drawings, in which—

Figure 1 is a vertical longitudinal section of the valve members in their coupled position. Fig. 2 is a top view of the female member, part broken away. Fig. 3 is a top view of the male member. Fig. 4 is an end view of the female member, and Fig. 5 is a similar view of the male member. Fig. 6 is a sectional view on the line 6—6 of Fig. 1.

Referring specifically to the drawings, in which similar reference characters indicate similar parts, the male coupling member comprises a cylindrical casing 7 having the inner chamber 15, an integral sleeve 18 of reduced diameter at one end thereof, and the cylindrical hose attaching portion 9 at the other end thereof, which are all in alinement or have a common axis. The bore 21 extends through the sleeve 18 to the chamber 15, and the passage 17 leads from the outer end of the portion 9 to the chamber 15. A cross-piece 14 in the casing 7 has a central hole 41, through which the stem 12 of the valve disk 11 slides. The valve disk is arranged on the inner end of the said stem, also having its rear side concaved as shown at 16, and the outer end of the stem has a key slot 13 therein. This valve disk can readily be inserted through the bore 21 of the sleeve 18, and then when in position a bushing 19 is screwed into the sleeve 18 by means of the external threaded portion of the said bushing engaging the internal thread of the counter-bore 42 in the outer end of the said sleeve, the key slots 20 being used to turn the said bushing. The outer face and inner end of the bushing is reduced in diameter to snugly fit within the inner end of the bore 21 as shown at 43. The inner end of the said bushing 19 forms the seat for the valve-disk 11, both being suitably beveled. The said seat is indicated at 22. On the periphery of the sleeve 18 and diametrically opposed to each other are the cam lugs 35 having their rear sides cammed or inclined as shown. Concentric with the sleeve 18 and the casing 7 and on the inner end of the said casing is an annular recess 30 containing a suitable packing ring or gasket, and on the edge of the said end of the casing 7 are the two diametrically opposed notches 32.

The female member comprises a cylindrical casing 8 of approximately the same dimensions as the male casing 7 having the inner chamber 33, and the hose attaching portion 10 at its outer end, through which the longitudinal passage 34 extends to the said chamber 33. The inner end of the casing 8 is open for the entrance of the sleeve 18 of the male member. A central pin or finger 23 is mounted on the cross-piece 24 of the casing 8 to project out the inner end of the said casing, being adapted to strike the valve disk 11 of the male member when the two parts are brought together. Internal cam lugs 36 in the casing 8 which are diametrically opposed to each other have their rear sides inclined or cammed to coöperate with the lugs 35 of the sleeve 18 to bind the two members together, by passing them between each other as will be understood and turning the said members to bring the inclined portions against each other and draw the ends of the members together. The annular rib 31 on the end of the casing 8 is arranged to enter the recess 30 to form a tight joint with the packing therein, and the projecting annular lip 29 of the female member is arranged to slide over the outer edge of the casing 7 to assist in the tight joint between the members and also cover the notches 32 in the casing 7. A latch-piece 25 is slidable in the longitudinal groove 40 on the periphery of the casing 8 and passes into the under-cut recess 39 beneath the lip 29, which is in alinement with the said groove. The inner or forward end of the said latch bears the pawl point 28 and the rear end is inclined outwardly and is knurled as shown at 26. A wire spring 27 or the like is fastened to the rear end of the said latch and is arched around the outer end of the casing to be attached to a lug 38 on the end of the casing. This spring tends to force the said latch forward or inward to engage the pawl point 28 with the notches 32. When thus engaged the said pawl point prevents the said members from turning with respect to each other for their separation, and necessarily locks them together. By pushing outwardly on the portion 26 of the latch the said pawl point is released and the members are free to be separated from each other. The projecting wall 37 outside of the spring 27 protects same from external forces.

In use, as the two members are brought together and the cam lugs 35 and 36 brought into contact the pawl point 28 engages in one of the notches to hold the members firmly together. In this position the air is free to flow around the valve disk 11 which has been forced from its seat by the finger 23, but as the members are separated and the finger 23 removed from the valve disk 11 the air, which flows in the direction of the arrow in Fig. 1, catches the valve disk, being assisted by the concaved back side thereof, and forces same tightly against its seat to prevent the escape of air when the said members are so separated The bushing 19 can readily be removed to regrind the valve seat, and the valve disk can then also be removed. When in assembled position the valve disk can be ground on the valve seat, or turned thereon, to better the contact between same to effectively close off the air supply by inserting a key through the passage 17 to engage the slot 13 in the end of the stem 12 of the valve disk 11. The construction described also provides for cheapness by allowing a number of the various parts to be made or cast integrally as will be apparent. The construction also affords of a symmetrical appearance of the coupling, which not only adds to the appearance but to the use as well.

It is understood that the hose portions 9 and 10 may be modified or altered, or they may be entirely replaced by any of the well known means for attaching hoses, pipes, tubing or the like, the construction of the members proper allowing for any devices for the above purpose that it is desired to use to be attached to the outer ends thereof and be made integral therewith. It is also understood that the construction of the members may be varied within the scope of the appended claims, and it is not desired to limit the same to the specific form and arrangement shown and described.

Having described my invention, what I claim as new is:

1. The combination with a coupling member having a reduced extension, a bushing in the extension formed with a valve seat, and a loosely supported valve; of a second member formed with a finger projecting through the bushing for holding the valve unseated when the members are coupled, means for coupling the members, a spring arm attached to said member and a locking pawl carried by said arm adapted to engage recesses in the first member.

2. The combination with a coupling member having a reduced extension, a bushing in the extension formed with a valve seat, an integral perforated web and a valve and valve stem loosely supported therein; of a second member incasing said extension and formed with an integral finger for holding said valve unseated, coupling means, a locking pawl on one member adapted to engage a recess on the other member, and a curved spring arm attached to said locking pawl.

In testimony whereof I affix my signature in the presence of two witnesses.

FRED KNACK.

Witnesses:
 EUGENE E. WOLF,
 MONROE E. MILLER.

---

Copies of this patent may be obtained for five cents each, by addressing the "Commissioner of Patents, Washington, D. C."